United States Patent
Yamauchi

(10) Patent No.: US 6,360,081 B1
(45) Date of Patent: Mar. 19, 2002

(54) BIDIRECTIONAL SIGNAL TRANSMISSION SYSTEM

(75) Inventor: Hiroyuki Yamauchi, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/642,374

(22) Filed: Aug. 21, 2000

(30) Foreign Application Priority Data

Aug. 19, 1999 (JP) .......................................... 11-233316

(51) Int. Cl.[7] ................................................ H04B 1/40
(52) U.S. Cl. ............................ 455/88; 455/73; 455/78; 455/13.4
(58) Field of Search .............................. 455/88, 73, 86, 455/13.4, 78, 91, 556, 561, 14; 370/284, 282; 375/259, 224

(56) References Cited

U.S. PATENT DOCUMENTS

| | | | | |
|---|---|---|---|---|
| 5,402,440 A | * | 3/1995 | Marbot | 375/224 |
| 5,541,535 A | | 7/1996 | Cao et al. | 326/83 |
| 5,666,354 A | * | 9/1997 | Cecchi | 370/284 |
| 5,801,549 A | * | 9/1998 | Cao | 326/83 |
| 5,910,736 A | * | 6/1999 | Nagata | 326/126 |

* cited by examiner

Primary Examiner—Vivian Chang
Assistant Examiner—John J Lee
(74) Attorney, Agent, or Firm—Ratner & Prestia

(57) ABSTRACT

A bidirectional signal transmission system of the present invention includes a first transceiver, a second transceiver, and a transmission line connecting the first transceiver and the second transceiver with each other, in which the first transceiver transmits a first signal to the second transceiver while the second transceiver simultaneously transmits a second signal to the first transceiver. The first transceiver includes: a first constant current circuit out of which a current flows, the current having a level which changes according to a logical level of the first signal; and a first current difference compensation circuit for compensating for a difference between the current flowing out of the first constant current circuit and a current flowing along the transmission line. The second transceiver includes: a second constant current circuit into which a current flows, the current having a level which changes according to a logical level of the second signal; and a second current difference compensation circuit for compensating for a difference between the current flowing into the second constant current circuit and the current flowing along the transmission line.

6 Claims, 6 Drawing Sheets

BIDIRECTIONAL SIGNAL TRANSMISSION SYSTEM

BACKGROUND OF THE INVENTION

1. Field of the Invention

The present invention relates to e signal transmission system for transmitting signals between two transceivers simultaneously and bidirectionally.

2. Description of the Related Art

A conventional system for transmitting signals between two ports simultaneously and bidirectionally is described in "1 Gb/s Current-Mode Bidirectional I/O buffer", 1997 Symposium on VSLI Circuits, Digest of Technical Papers, pp. 121–122.

FIG. 6 illustrates the configuration of the conventional system as described in this article.

The transmitter side of each port turns its switch ON/OFF according to a logical level of a signal IN1 or IN2, thus controlling the current flowing from a constant current circuit to a transmission line 30.

A signal is transmitted from the port of a chip CHIP1 to the port of a chip CHIP2 via the transmission line 30 while another signal is simultaneously transmitted from the port of the chip CHIP2 to the port of the chip CHIP1 via the transmission line 30.

Table 1 below illustrates the operation of the conventional system shown in FIG. 6.

TABLE 1

| IN1 | high | high | low | low |
|---|---|---|---|---|
| IN2 | high | low | high | low |
| $I_2*I_3$ | 2*I | 1.5*I | 1.5*I | I |
| $I_3$ | 0 | 0.5*I | −0.5*I | 0 |
| $I_{ref1}$ | 1.75*I | 1.75*I | 1.25*I | 1.25*I |
| $I_{ref2}$ | 1.75*I | 1.25*I | 1.75*I | 1.25*I |
| $O_1$ | high | low | high | low |
| $O_2$ | high | high | low | low |

As shown in Table 1, the receiver side of each port detects the voltage at a node $O_1$ and the voltage at a node $O_2$ so as to determine the logical level of the signal transmitted from the transmitter side of each port.

The conventional system described above has the following problems (1) and (2).

(1) The conventional system has a substantial power consumption. For example, when each port transmits the signal IN1 or IN2 having a logical level of "1" ("high"), the total current of 4*I flowing out of four constant current sources is consumed. Herein, "I" denotes a current flowing out of one constant current source. Particularly, the problem of having a substantial power consumption is more pronounced as the number of ports that are simultaneously operated is increased.

(2) The direction along the transmission line 30 in which a current $I_3$ flows changes according to the logical level of the signal being transmitted. When the direction of the current $I_3$ changes, it is difficult to suppress the electromagnetic radiation from the transmission line 30. Moreover, when the direction of the current $I_3$ changes, it may be necessary to control the current to flow from a position where the power source potential is low to another position where the power source potential is highs This is because a voltage drop occurs due to the resistance of the power source line in a case where the power source potential is provided to each port via the power source line. Controlling a current to flow from a position where the power source potential is low to another position where the power source potential in high is very difficult because it is against the law of nature.

SUMMARY OF THE INVENTION

According to one aspect of this invention, there is provided a bidirectional signal transmission system including a first transceiver, a second transceiver, and a transmission line connecting the first transceiver and the second transceiver with each other, in which the first transceiver transmits a first signal to the second transceiver while the second transceiver simultaneously transmits a second signal to the first transceiver. The first transceiver includes: a first constant current circuit out of which a current flows, the current having a level which changes according to a logical level of the first signal; and a first current difference compensation circuit for compensating for a difference between the current flowing out of the first constant current circuit and a current flowing along the transmission line. The second transceiver includes: a second constant current circuit into which a current flows, the current having a level which changes according to a logical level of the second signal; and a second current difference compensation circuit for compensating for a difference between the current flowing into the second constant current circuit and the current flowing along the transmission line.

In one embodiment of the invention, a difference between the current flowing out of the first constant current circuit and the current flowing into the first current difference compensation circuit is greater than a difference between the current flowing out of the second current difference compensation circuit and the current flowing into the second constant current circuit.

In one embodiment of the invention, a power source potential is provided to the first transceiver and the second transceiver via a power source line, and a direction in which a voltage decreases along the power source line coincides with a direction in which the current flows along the transmission line.

In one embodiment of the invention, the bidirectional signal transmission system further includes a current consumption stabilization circuit for constantly maintaining a current consumption in the bidirectional signal transmission system independently of the logical level of the first signal and the logical level of the second signal.

According to still another aspect of this invention, there is provided a bidirectional signal transmission system for signal transmission between a first transceiver and a second transceiver. The bidirectional signal transmission system includes a plurality of transmission units. Each of the transmission units includes a transmission line for connecting the first transceiver and the second transceiver with each other, transmits a first signal from the first transceiver to the second transceiver while simultaneously transmitting a second signal from the second transceiver to the first transceiver, and generates onto the transmission line a current which flows in a predetermined direction for the transmission unit irrespective of a value of the first signal and a value of the second signal, the predetermined direction being one of a first direction from the first transceiver to the second transceiver and a second direction from the second transceiver to the first transceiver. Among the plurality of transmission units included in the bidirectional signal transmission system, the number of transmission units which generate a current which flows in the first direction is substantially equal to the number of transmission units which generate a current which flows in the second direction.

In one embodiment of the invention, each of the transmission units further includes a first constant current circuit out of which a current flows, the current having a level which changes according to a logical level of the first signal; a first current difference compensation circuit for compensating for a difference between the current flowing out of the first constant current circuit and a current flowing along the transmission line; a second constant current circuit into which a current flows, the current having a level which changes according to a logical level of the second signal; and a second current difference compensation circuit for compensating for a difference between the current flowing into the second constant current circuit and the current flowing along the transmission line. Each of the first constant current circuit and the first current difference compensation circuit is connected to an end of the transmission line on the side of the first transceiver. Each of the second constant current circuit and the second current difference compensation circuit is connected to another end of the transmission line on the side of the second transceiver.

Thus, the invention described herein makes possible the advantages of (1) providing a bidirectional signal transmission system having a low power consumption; and (2) providing a bidirectional signal transmission system in which the direction of a current flowing along a transmission line does not change according to the logical level of the signal being transmitted.

These and other advantages of the present invention will become apparent to those skilled in the art upon reading and understanding the following detailed description with reference to the accompanying figures.

DESCRIPTION OF THE PREFERRED EMBODIMENTS

Various embodiments of the present invention will now be described with reference to the accompanying figures.

Embodiment 1

Figure 1:
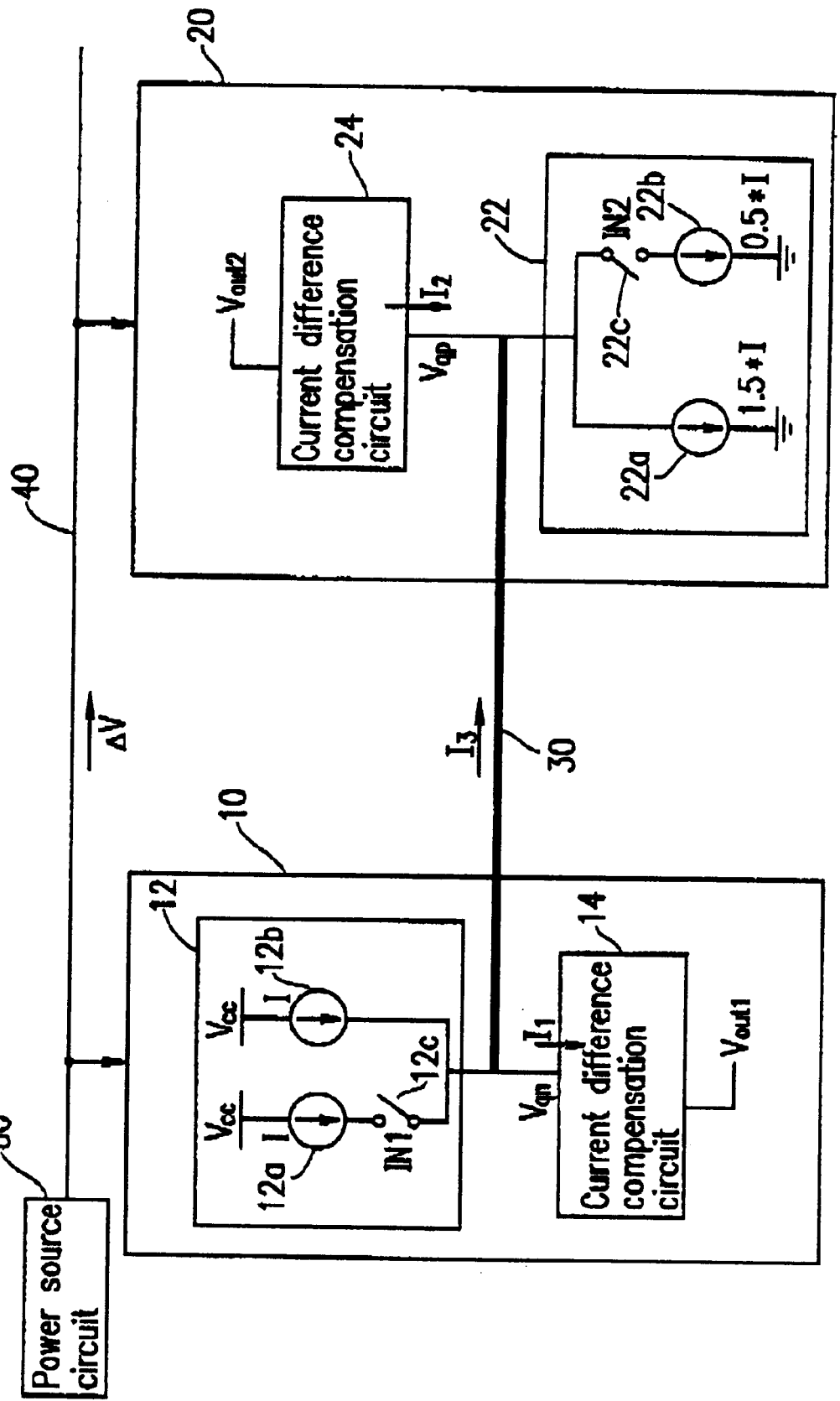
FIG. 1 illustrates a configuration of a bidirectional signal transmission system 1 according to Embodiment 1 of the present invention.

FIG. 1 illustrates a configuration of a bidirectional signal transmission system 1 according to Embodiment 1 of the present invention.

The bidirectional signal transmission system 1 includes a first transceiver 10, a second transceiver 20, and a transmission line 30 connecting the first transceiver 10 and the second transceiver 20 with each other.

In the bidirectional signal transmission system 1, the first transceiver 10 transmits a signal IN1 having a logical level of "0" or "1" to the second transceiver 20 via the transmission line 30 while the second transceiver 20 simultaneously transmits a signal IN2 having a logical level of "0" or "1" to the first transceiver 10 via the transmission line 30.

It is assumed in the following description that the logical level of "0" corresponds to "low" and the logical level of "1" corresponds to "high". It should be apparent however that the correlation may be reversed, i.e., "0" corresponding to "high" and "I" corresponding to "low".

The first transceiver 10 includes a first constant current circuit 12 and a first current difference compensation circuit 14.

A current flows out of the first constant current circuit 12 which has a level which changes according to the logical level (i.e., "0" or "1") of the signal IN1 transmitted from the first transceiver 10 to the second transceiver 20. For example, when transmitting the signal IN1 having the logical level "0", a current of I (mA) flows out of the first constant current circuit 12. When transmitting the signal IN1 having the logical level "1", a current of 2*I (mA) flows out of the first constant current circuit 12. Herein, I may be any value.

Such a function of the first constant current circuit 12 is may be implemented by, for example, configuring the first constant current circuit 12 so as to include an I (MA) constant current source 12a, another I (mA) constant current source 12b, and a switch 12c, as illustrated in FIG. 1. One end of the constant current source 12a is connected to a power source potential $V_{cc}$, and the other end thereof is connected to the transmission line 30 via the switch 12c. One end of the constant current source 12b is connected to the power source potential $V_{cc}$, and the other end thereof is connected to the transmission line 30. The power source potential $V_{cc}$ is, for example, 1.5 V.

When transmitting the signal IN1 having the logical level "0", the switch 12c is turned OFF. Thus, the current of I (mA) from the constant current source 12b flows out of the first constant current circuit 12. When transmitting the signal IN1 having the logical level "1", the switch 12a is turned ON. Thus, a total current of 2*I (mA) of the current of I (mA) from the constant current source 12a and the current of I (mA) from the constant current source 12b flows out of the first constant current circuit 12.

The first current difference compensation circuit 14 compensates for the difference between the current flowing out of the first constant current circuit 12 and the current flowing along the transmission line 30 by controlling the current 1., The second transceiver 20 includes a second constant current circuit 22 and a second current difference compensation circuit 24.

A current flows into the second constant current circuit 22, the current having a level which changes according to the logical level (i.e., "0" or "1") of the signal IN2 transmitted from the second transceiver 20 to the first transceiver 10. For example, when transmitting the signal IN2 having the logical level 101, a current of 1.5*I (mA) flows into the second constant current circuit 22. When transmitting the signal IN2 having the logical level "1", a current of 2*I (mA) flows into the second constant current circuit 22. Herein, I may be any value.

Such a function of the second constant current circuit 22 can be implemented by, for example, configuring the second constant current circuit 22 so as to include an 1.5*I (mA) constant current source 22a, a 0.5*I (mA) constant current source 22b, and a switch 22c, as illustrated in FIG. 1. One end of the constant current source 22a is connected to a ground potential $V_{ss}$, and the other end thereof is connected to the transmission line 30. One end of the constant current source 22b is connected to the ground potential $V_{ss}$, and the other end thereof is connected to the transmission line 30 via the switch 22c. The ground potential $V_{ss}$ is, for example, 0 V.

When transmitting the signal IN2 having the logical level "0", the switch 22c is turned OFF. Thus, the current of 1.5*I (mA) to the constant current source 22a flows into the second constant current circuit 22. When transmitting the signal IN2 having the logical level "1", the switch 22a is turned ON. Thus, a total current of 2*I (mA) of the current of 1.5*I (mA) to the constant current source 22a and the current of 0.5*I (mA) to the constant current source 22b flows into the first constant current circuit 22.

The second current difference compensation circuit 24 compensates for the difference between the current flowing into the second constant current Circuit 22 and the current flowing along the transmission line 30 by controlling the current $I_3$.

Table 2 below illustrates the operation of the bidirectional signal transmission system 1.

TABLE 2

| IN1 | high | high | low | low |
|---|---|---|---|---|
| IN2 | high | low | high | low |
| $I_1$ | 0 | 0.5*I | −0.5*I | 0 |
| $I_2$ | 0 | 0 | 0.5*I | 0.5*I |
| $I_3$ | 2*I | 1.5*I | 1.5*I | I |
| Current consumption | 2*I | 2*I | 2*I | 1.5*I |

Maximum current consumption: 2*I
Average current consumption: 1.875*I
Minimum current consumption: 1.5*I In Table 2, IN1 represents the logical level of the signal transmitted from the first transceiver 10 to the second transceiver 20, IN2 represents the logical level of the signal transmitted from the second transceiver 20 to the first transceiver 10, $I_1$ represents the current flowing into the first current difference compensation circuit 14, $I_2$ represents the current flowing out of the second current difference compensation circuit 24, and $I_3$ represents the current flowing along the transmission line 30.

When the logical level of the signal IN1 is "1" ("high") and the logical level of the signal IN2 is "1" ("high"), the switch 12a is turned ON and the switch 22a is turned ON. In such a case, the current of 2*I (mA) flowing out of the first constant current circuit 12 is conducted along the transmission line 30 to flow into the second constant current circuit 22. Thus, $I_1$=0 (mA), $I_2$=0 (mA) and $I_3$=2*I (mA).

When the logical level of the signal IN1 is "1" ("high") and the logical level of the signal IN2 is "0" ("low"), the switch 12c is turned ON and the switch 22a is turned OFF. In such a case, a 0.5*I (mA) portion of the current of 2*I (mA) flowing out of first constant current circuit 12 flows into the first current difference compensation circuit 14, and the other 1.5*I (mA) portion thereof is conducted along the transmission line 30 and flows into the second constant current circuit 22. Thus, $I_1$=0.5*I (mA), $I_2$=0.5*I (mA) and $I_3$=1.5*I (mA).

When the logical level of the signal IN1 is "0" ("low") and the logical level of the signal IN2 is "1" ("high"), the switch 12c is turned OFF and the switch 22c is turned ON. In such a case, a total current of 1.5*I (mA) of the current of I (mA) flowing out of the first constant current circuit 12 and the current of −0.5*I (mA) flowing into the first current difference compensation circuit 14 (i.e., the current of 0.5*I (mA) flowing out of the first current difference compensation circuit 14) is conducted along the transmission line 30. A total current of 2*I (mA) of the current of 1.5*I (mA) flowing along the transmission line 30 and the current of 0.5*I (mA) flowing out of the second current difference compensation circuit 24 flows into the second constant current circuit 22. Thus, $I_1$=−0.5*I (mA), $I_2$=0.5*I (mA) and $I_3$=1.5*I (mA).

When the logical level of the signal IN1 is "0" ("low") and the logical level of the signal IN2 is "0" ("low"), the switch 12a is turned OFF and the switch 22c is turned OFF. In such a case, the current of I (mA) flowing out of the first constant current circuit 12 is conducted along the transmission line 30. A total current of 1.5*I (mA) of the current of I (mA) flowing along the transmission line 30 and the current of 0.5*I (mA) flowing out of the second current difference compensation circuit 24 flows into the second constant current circuit 22. Thus, $I_1$=0 (mA), $I_2$=0.5 (mA) and $I_3$=I (mA).

Figure 6:
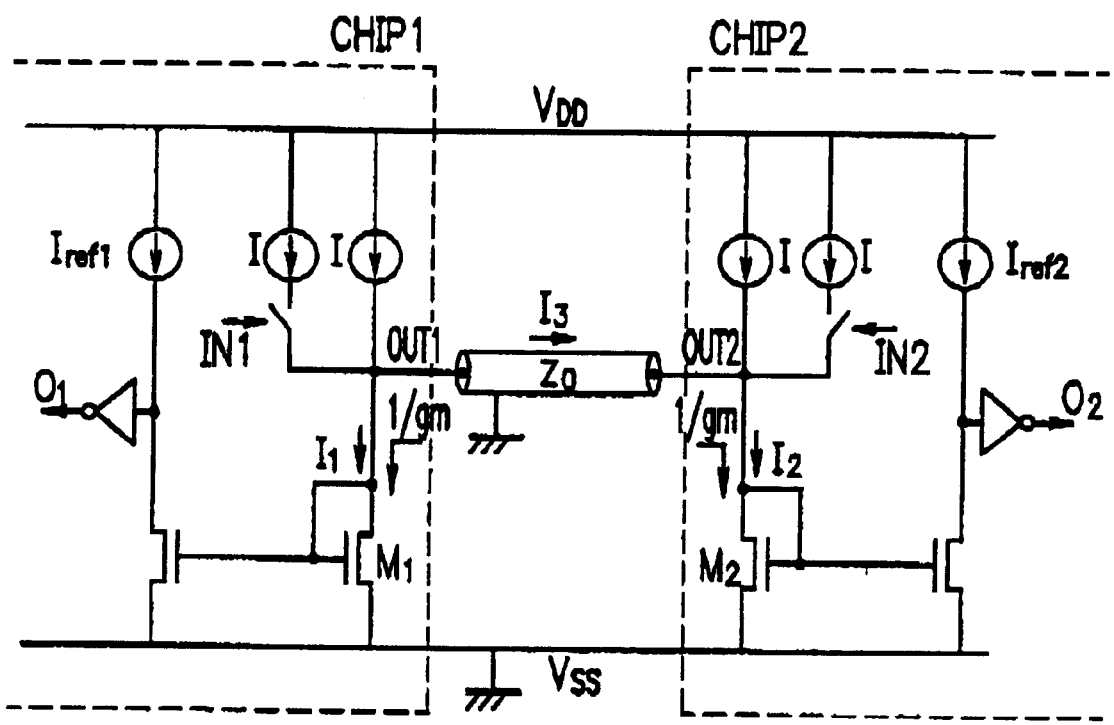
FIG. 6 Illustrates a configuration of a conventional system.

The current consumption of the bidirectional signal transmission system 1 is equal to the larger one of the is current flowing out of the first constant current circuit 12 and the current flowing into the second constant current circuit 22. Therefore, the maximum current consumption is 2*I (mA) (see Table 2). On the other hand, the current consumption of the conventional system illustrated in FIG. 6 is the sum of the currents flowing out of the constant current circuits of the respective ports. Therefore, the maximum current consumption is 4*I (mA). Thus, the bidirectional signal transmission system 1 of the present invention has an advantage of substantially reducing the current consumption from that of the conventional system illustrated in FIG. 6.

The current $I_5$ flows along the transmission line 30 in a constant direction (i.e., a direction from the first transceiver 10 toward the second transceiver 20) independently of the combination of the logical level of the signal IN1 and the logical level of the signal IN2. This is because the difference ($I_3$) between the current flowing out of the first constant current circuit 12 and the current flowing into the first current difference compensation circuit 14 in greater than the difference (−$I_3$) between the current flowing out of the second current difference compensation circuit 24 and the current flowing into the second constant current circuit 22.

A power source circuit 80 provides the power source potential $V_{cc}$ to the first transceiver 10 and the second transceiver 20 via a power source line 40. Although not shown in FIG. 1, the power source line 40 is connected to each power source potential $V_{cc}$ of the first constant current circuit 12, the first current difference compensation circuit 14 and the second current difference compensation circuit 24. In FIG. 1, an arrow ΔV denotes the direction in which the voltage decreases along the power source line 40.

The power source line 40 is preferably arranged such that the direction in which the voltage decreases along the power source line 40 coincides with the direction of the current $I_3$ flowing along the transmission line 30. When the power source line 40 is arranged in such a manner, there is provided an advantage that the signal transmission between the first transceiver 10 and the second transceiver 20 is less likely to be influenced by the voltage decrease along the power source line 40.

Table 3 below is used by the first transceiver 10 to determine the logical level of the signal IN2 transmitted from the second transceiver 20.

TABLE 3

| IN1 | high | high | low | low |
|---|---|---|---|---|
| $I_1$ | 0 | 0.5*I | −0.5*I | 0 |
| $V_{out1}$ | high | low | high | low |

The logical level of the signal IN2 is represented by the direction and the level of the current $I_1$ flowing into the first current difference compensation circuit 14. Therefore, the logical level of the signal IN2 can be determined by detecting, by means of the first transceiver 10, the direction and the level of the current $I_1$. The direction and the level of the current $I_1$ can be converted into the voltage level of a voltage $V_{out1}$ output from the first current difference compensation circuit 14. Therefore, the logical level of the signal IN2 can be determined by detecting, by means of the first transceiver 10, the voltage level of the voltage $V_{out1}$.

Table 4 below is used by the second transceiver 20 to determine the logical level of the signal IN1 transmitted from the first transceiver 10.

TABLE 4

| IN2 | high | high | low | low |
|---|---|---|---|---|
| $I_2$ | 0 | 0.5*I | 0 | 0.5*I |
| $V_{out2}$ | high | low | high | low |

The logical level of the signal IN1 is represented by the level of the current $I_3$ flowing out of the second current difference compensation circuit 24. Therefore, the logical level of the signal IN1 can be determined by detecting, by means of the second transceiver 20, the level of the current $I_2$. The level of the current $I_2$ can be converted into the voltage level of a voltage $V_{out2}$ output from the second current difference compensation circuit 24. Therefore, the logical level of the signal IN1 can be determined by detecting, by means of the second transceiver 20, the voltage level of the voltage $V_{out2}$.

Thus, with the logical level of the signal IN1 transmitted from the first transceiver 10 to the second transceiver 20 being unchanged, the logical level of the signal IN2 can be determined by the first transceiver 10 by detecting at the first transceiver 10 the current transmitted from the second transceiver 20 to the first transceiver 10 and having a level which changes according to the logical level of the signal IN2.

Similarly, with the logical level of the signal IN2 transmitted from the second transceiver 20 to the first transceiver 10 being unchanged, the logical level of the signal IN1 can be determined by the second transceiver 20 by detecting at the second transceiver 20 the current transmitted from the first transceiver 10 to the second transceiver 20 and having a level which changes according to the logical level of the signal IN1.

This allows the signal IN1 and the signal IN2 to be simultaneously and bidirectionally transmitted between the first transceiver 10 and the second transceiver 20.

Figure 2A:
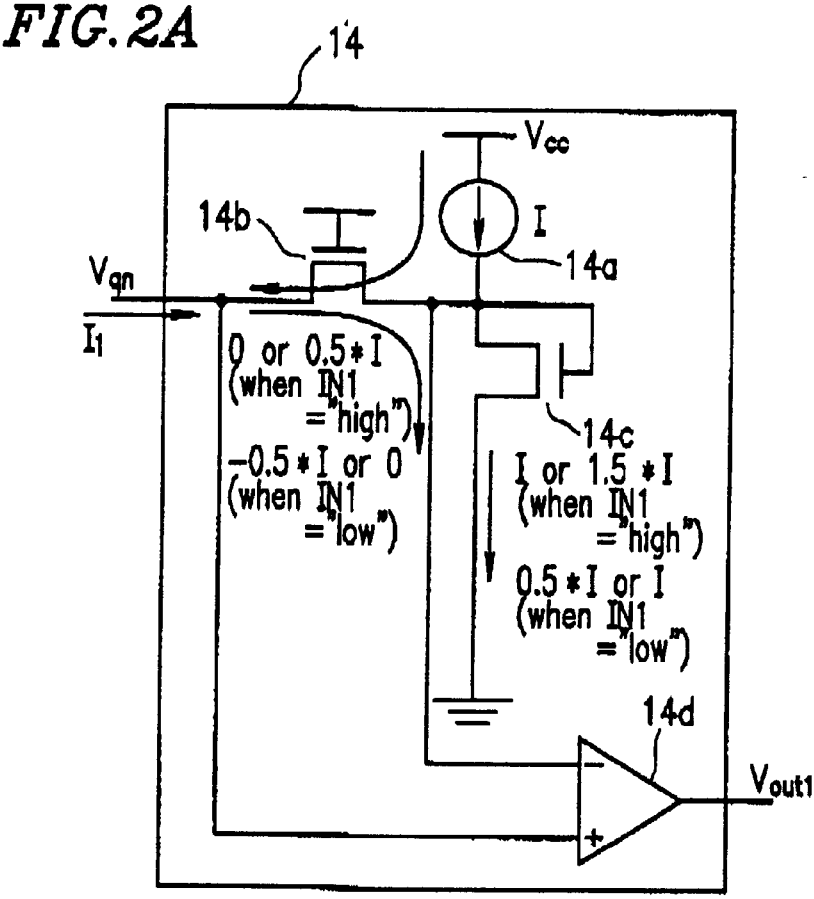
FIG. 2A illustrates an exemplary configuration of a current difference compensation circuit 14.

FIG. 2A illustrates an exemplary configuration of the first current difference compensation circuit 14. The first current difference compensation circuit 14 is configured to provide a compensation current 1 in the range of 0 (mA) to +0.5*I (mA) when the logical level of the signal IN1 is "high" and in the range of −0.5*I (mA) to 0 (mA) when the logical level of the signal IN1 is "low".

The first current difference compensation circuit 14 includes an I (mA) constant current source 14a, transistor 14b, a transistor 14a and a comparator 14d. The transistor 14b is a limiter transistor having a function of limiting the current flowing therethrough to 0.5*I (mA). The comparator 14d is used to detect the voltage between the terminals of the transistor 14b.

Figure 2B:
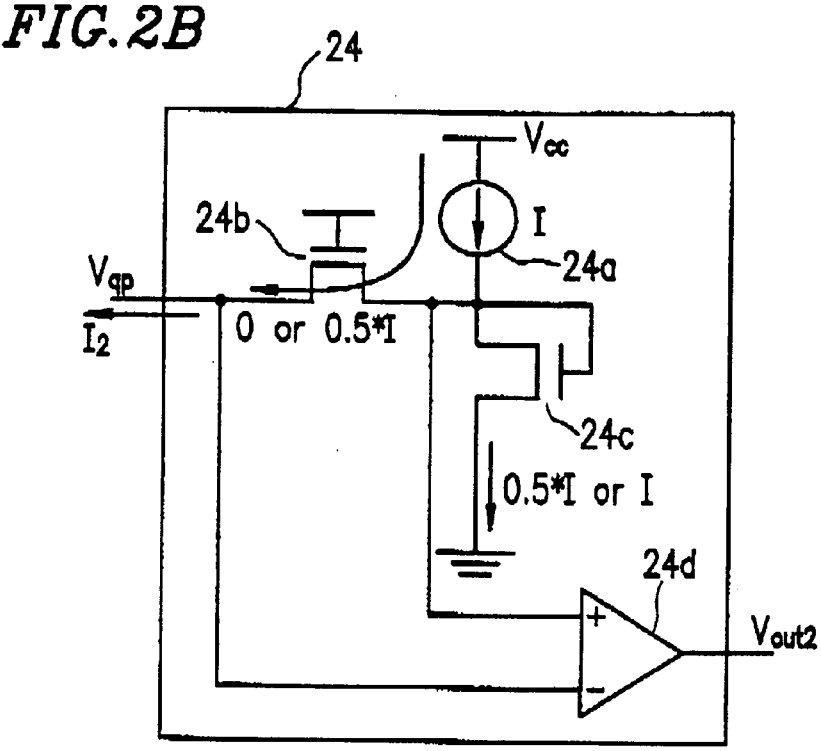
FIG. 2B illustrates an exemplary configuration of a current difference compensation circuit 24.

FIG. 2B illustrates an exemplary configuration of the second current difference compensation circuit 24. The second current difference compensation circuit 24 is configured to provide a compensation current $I_2$ in the range of 0 (mA) to +0.5*I (mA).

The second current difference compensation circuit 24 includes an I (mA) constant current source 24a, transistor 24b, a transistor 24c and a comparator 244. The transistor 24b is a limiter transistor having a function of limiting the current flowing therethrough to 0.5*I (mA), The comparator 24d is used to detect the voltage between the terminals of the transistor 24b.

Embodiment 2

Figure 3:
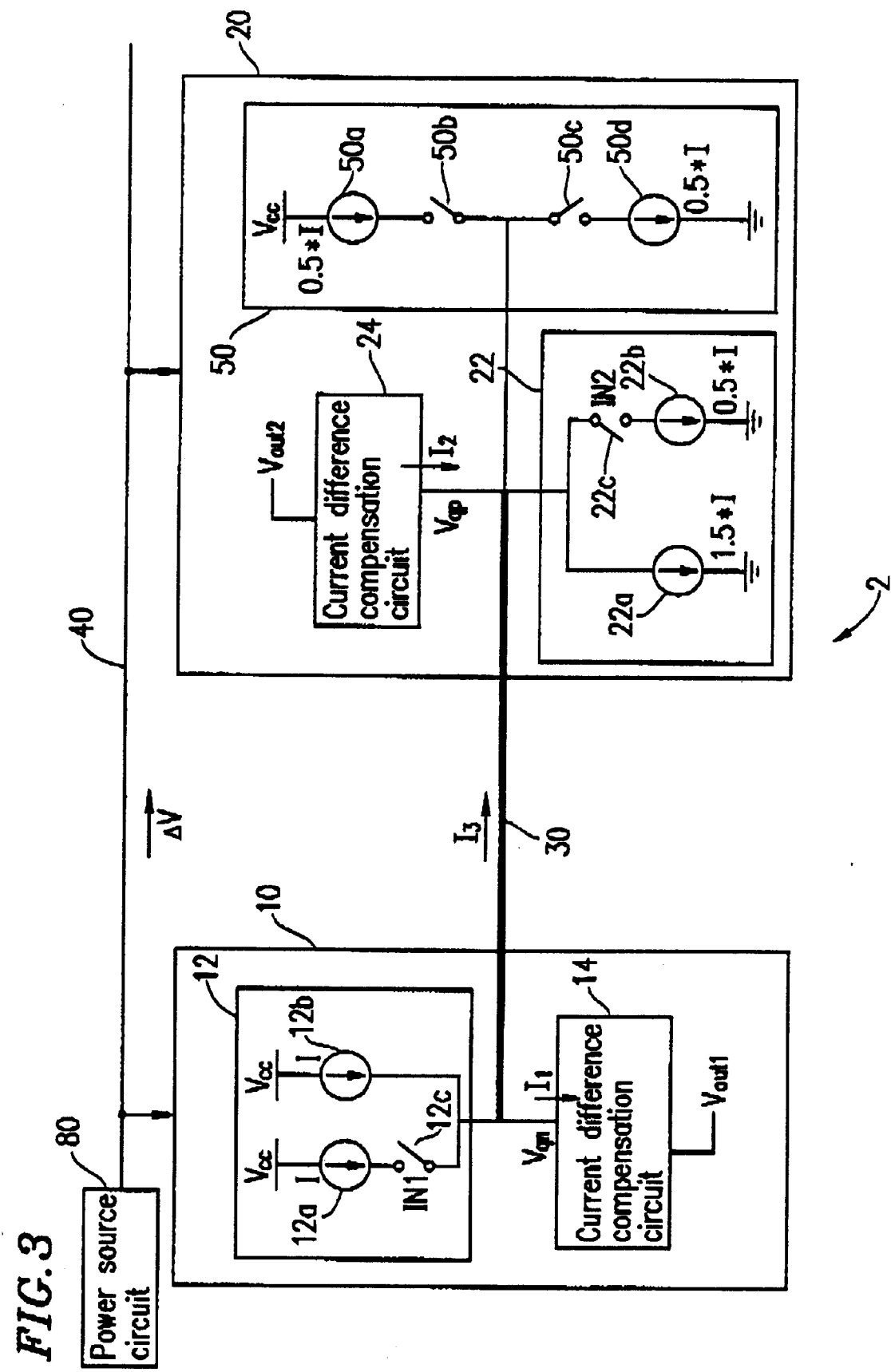
FIG. 3 illustrates a configuration of a bidirectional signal transmission system 2 according to Embodiment 2 of the present invention.

FIG. 3 illustrates a configuration of a bidirectional signal transmission system 2 according to Embodiment 2 of the present invention.

The bidirectional signal transmission system 2 includes a current consumption stabilization circuit 50 in addition to the elements included in the bidirectional signal transmission system 1.

Elements in FIG. 3 having like reference numerals to those shown in FIG. 1 will not be further described.

As Illustrated in FIG. 3, the current consumption stabilization circuit 50 includes a 0.5*I (mA) constant current source 50a, a switch 50b, a switch 50c and a 0.5*I (mA) constant current source 50d. One end of the constant current source 50a is connected to the power source potential $V_{cc}$, and the other end thereof is connected to the transmission line 30 via the switch 50b. One end of the constant current source 50d is connected to the ground potential $V_{cc}$, and the other end thereof is connected to the transmission line 30 via the switch 50c.

When the logical level of the signal IN2 is "0" ("low") and the voltage level of the voltage $V_{out2}$ is "low", the switches 50b and 50c are turned ON. Otherwise, the switches 50b and 50c are turned OFF.

When the switches 50b and 50c are turned ON, a current of 0.5*I (mA) is conducted from the constant current source 50a toward the constant current source 50d. As a result, the current consumption increases by 0.5*I (mA).

Thus, the current consumption stabilization circuit 50 operates so that the current consumption is 2*I (mA) when the logical level of the signal IN1 is "0" ("low") and the logical level of the signal IN2 is "0" ("low").

Table 5 below illustrates the operation of the bidirectional signal transmission system 2.

TABLE 5

| IN1 | high | high | low | low |
|---|---|---|---|---|
| IN2 | high | low | high | low |
| $I_1$ | 0 | 0.5*I | −0.5*I | 0 |
| $I_2$ | 0 | 0 | 0.5*I | 0.5*I |
| $I_3$ | 2*I | 1.5*I | 1.5*I | I |
| Current Consumption | 2*I | 2*I | 2*I | 2*I |

Maximum current consumption: 2*I
Average current consumption: 2*I
Minimum current consumption: 2*I Table 5 shows that the current consumption is 2*I (mA) when the logical level of the signal IN1 is "I" ("low") and the logical level of the signal IN2 is "0" ("low").

Thus, by utilizing the current consumption stabilization circuit 50, it is possible to maintain the current consumption at a constant level (i.e., 2*I (mA)) independently of the combination of the logical level of the signal IN1 and the logical level of the signal IN2. The current consumption being constant means that the current flowing along the power source line 40 is constant. Thus, it is possible to suppress fluctuations of the voltage along the power source line 40 due to fluctuations of current. As a result, it is possible to provide an advantage of stabilizing the power source. Moreover, there is also provided an advantage that an electromagnetic radiation does not occur through the power source line 40.

While the current consumption stabilization circuit 50 is provided in the second transceiver 20 in the example shown in FIG. 3, the arrangement of the current consumption stabilization circuit 50 is not limited to this Embodiment 3

Figure 4:
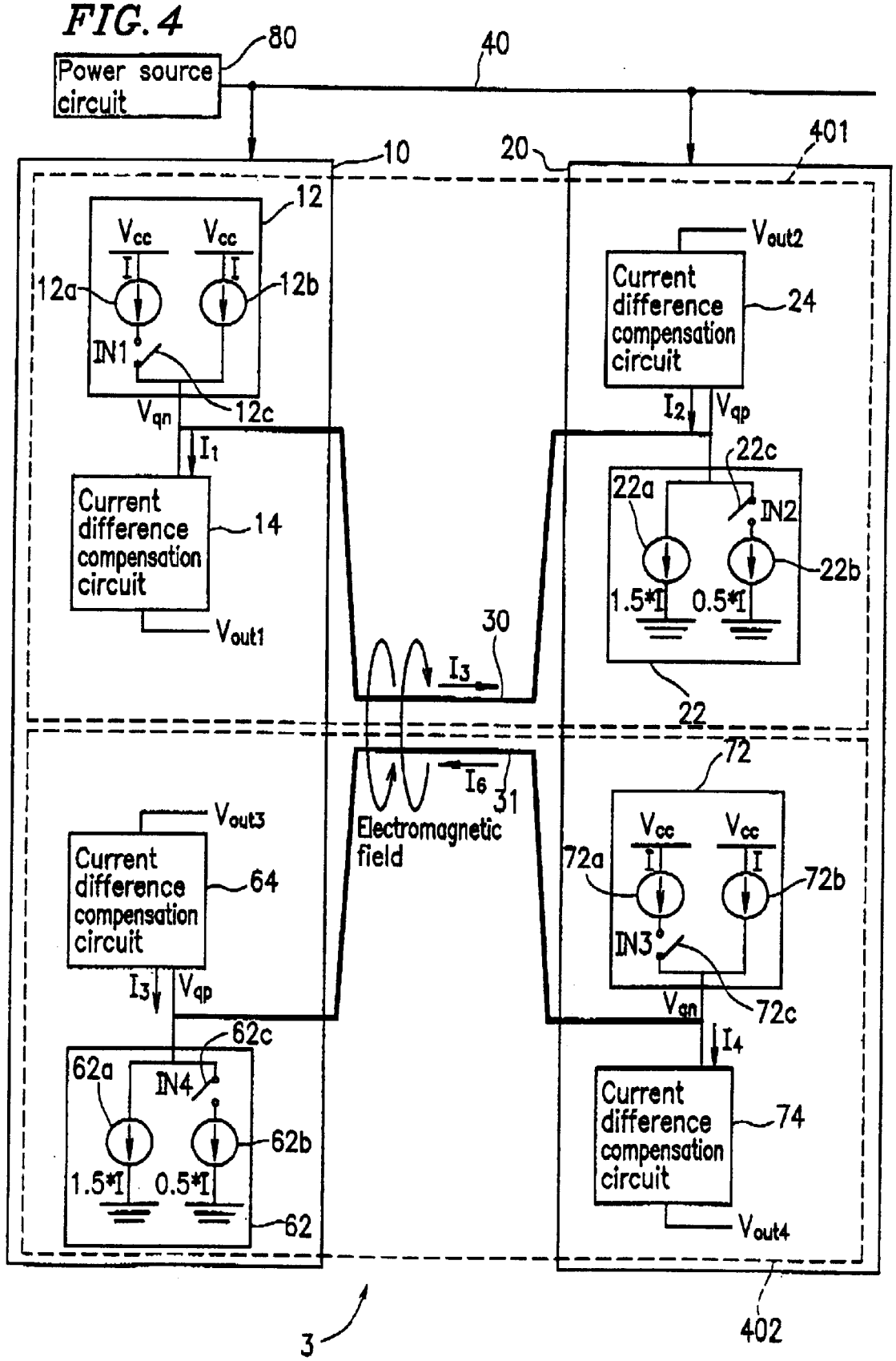
FIG. 4 illustrates a configuration of a bidirectional signal transmission system 3 according to Embodiment 3 of the present invention.

FIG. 4 illustrates a configuration of a bidirectional signal transmission system 3 according to Embodiment 3 of the present invention.

Elements in FIG. 4 having like reference numerals to those shown in FIG. 1 will not be further described.

The bidirectional signal transmission system 3 includes the first transceiver 10, the second transceiver 20, the transmission line 30 and another transmission line 31 or connecting the first transceiver 10 and the second transceiver 20 with each other. The transmission lines 30 and 31 are adjacent to each other.

In the bidirectional signal transmission system 3, the first transceiver 10 transmits the signal IN1 having a logical level of "0" or "1" to the second transceiver 20 via the transmission line 30 while the second transceiver 20 simultaneously transmits the signal IN2 having a logical level of "0" or "1" to the first transceiver 10 via the transmission line 30. Moreover, the second transceiver 20 transmits a signal IN3 having a logical level of "0" or "1" to the first transceiver 10 via the transmission line 31 while the first transceiver 10 simultaneously transmits a signal IN4 having a logical level of "0" or "1" to the second transceiver 20 via the transmission line 31.

The first transceiver 10 includes a third constant current circuit 62 and a third current difference compensation circuit 64 in addition to the first constant current circuit 12 and the first current difference compensation circuit 14. The configuration and the operation of the third constant current circuit 62 and the third current difference compensation circuit 64 are similar to those of the second constant current circuit 22 and the second current difference compensation circuit 24, respectively, as described in Embodiment 1 above.

The second transceiver 20 includes a fourth constant current circuit 72 and a fourth current difference compensation circuit 74 in addition to the second constant current circuit 22 and the second current difference compensation circuit 24. The configuration and the operation of the fourth constant current circuit 72 and the fourth current difference compensation circuit 74 are similar to those of the first constant current circuit 12 and the first current difference compensation circuit 14, respectively, as described in Embodiment 1 above.

The current $I_3$ flows in a constant direction (i.e., a direction from the first transceiver 10 toward the second transceiver 20) independently of the combination of the logical level of the signal IN1 and the logical level of the signal IN1. A current $I_6$ flows in a constant direction (i.e., a direction from the second transceiver 20 toward the first transceiver 10) independently of the combination of the logical level of the signal IN3 and the logical level of the signal IN4.

By controlling the current $I_3$ and the current $I_6$ to flow in the opposite directions, it is possible to cancel the electromagnetic fields generated by the current $I_3$ and the current $I_6$ around the transmission lines 30 and 31, respectively. Thus, it is possible to suppress fluctuations of the voltages along the transmission lines 30 and 31.

FIG. 4 shows an example where there are provided two transmission lines (i.e., the transmission lines 30 and 31) between the first transceiver 10 and the second transceiver 20. However, the number of transmission lines provided between the first transceiver 10 and the second transceiver 20 in a bidirectional signal transmission system of the present invention is not limited to two.

Figure 5:
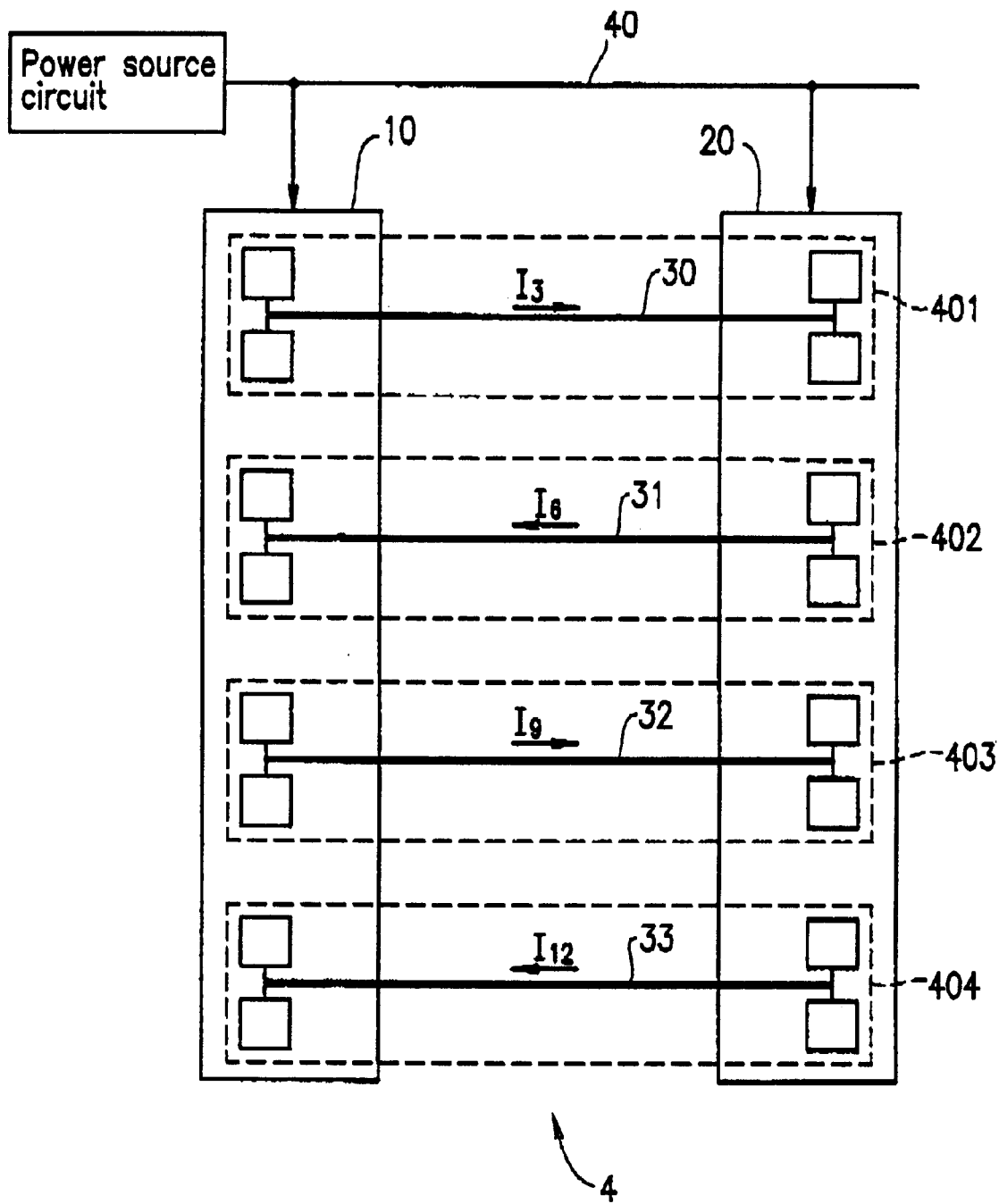
FIG. 5 illustrates a configuration of a bidirectional signal transmission system 4 in which four transmission lines are provided between a transceiver 10 and a transceiver 20;.

As a variation of the present embodiment, FIG. 5 illustrates a configuration of a bidirectional signal transmission system 4 where there are provided four transmission lines (i.e., transmission lines 30 to 33) between the first transceiver 10 and the second transceiver 20. The bidirectional signal transmission system 4 includes a plurality of transmission units 401 to 404. The transmission units 401 and 402 have the same configurations as those of the sections indicated by broken lines and the same reference numerals 401 and 402 in FIG. 4, The transmission unit 403 has the same configuration as that of the transmission unit 401, and the transmission unit 404 has the same configuration as that of the transmission unit 402. The transmission units 401 to 404 include the transmission lines 30 to 33, respectively. Each of the transmission units 401 to 404 bidirectionally transmits a signal between the first transceiver 10 and the second transceiver 20.

As already discussed above with reference to FIG. 4, the currents flowing through the transmission lines respectively included in the transmission units 401 and 403 (i.e., currents $I_3$ and $I_9$) flow in a constant direction (i.e., a direction from the first transceiver 10 toward the second transceiver 20: hereinafter, referred to as the "first direction") independently of the combination of the logical levels of the signals transmitted by the transmission units between the first transceiver 10 and the second transceiver 20. Similarly, the currents flowing through the transmission lines respectively included in the transmission units 402 and 404 (i.e., currents $I_6$ and $I_{12}$) flow in a constant direction (i.e., a direction from the second transceiver 20 toward the first transceiver 10: hereinafter, referred to as the "second direction") independently of the combination of the logical levels of the signals transmitted by the transmission units between the first transceiver 10 and the second transceiver 20, Therefore, where a plurality of transmission units are included in a bidirectional signal transmission system, the electromagnetic fields around a plurality of transmission lines can be canceled by one another when the number of transmission units including transmission lines along which currents flow in the first direction is substantially equal to the number of transmission units including transmission lines along which currents flow in the second direction. Thus, it is possible to suppress fluctuations of the voltages along the transmission lines. Herein, "substantially equal" refers not only to a case where the number of transmission units including transmission lines along which currents flow in the first direction is exactly the same as the number of transmission units including transmission lines along which currents flow in the second direction, but also to a case where the numbers are as close to each other as possible when, for example, an odd number of transmission units are included in the bidirectional signal transmission system.

Where the plurality of transmission lines 30 to 33 are bundled into a single line, each of the transmission lines can be twisted, or shielded from the others.

In the bidirectional signal transmission system of the present invention, the difference between the current flowing out of the first constant current circuit and the current flowing along the transmission line can be compensated for by the first current difference compensation circuit, and the difference between the current flowing into the second constant current circuit and the current flowing along the transmission line can be compensated for by the second current difference compensation circuit. Thus, it is possible to provide a bidirectional signal transmission system having a low power consumption.

Moreover, in the bidirectional signal transmission system of the present invention, the difference between the current flowing out of the first constant current circuit and the current flowing into the first current difference compensation circuit is greater than the difference between the current flowing out of the second current difference compensation circuit and the current flowing into the second constant current circuit. Thus, a current can flow along the transmission line in a constant direction independently of the combination of the logical level of the first signal and the logical level of the second signal.

Furthermore, in the bidirectional signal transmission system of the present invention, the direction in which the voltage decreases along the power source line coincides with the direction in which the current flows along the transmission line. Thus, there is provided an advantage that the signal transmission between the first transceiver and the second transceiver is less likely to be influenced by the voltage decrease along the power source line.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A bidirectional signal transmission system, comprising a first transceiver, a second transceiver, and a transmission line connecting the first transceiver and the second transceiver with each other, in which the first transceiver transmits a first signal to the second transceiver while the second transceiver simultaneously transmits a second signal to the first transceiver, wherein:

the first transceiver comprises:
   a first constant current circuit out of which a current flows, the current having a level which changes according to a first logical level of the first signal; and
   a first current difference compensation circuit for compensating for a difference between the current flowing out of the first constant current circuit and a current flowing along the transmission line in a direction from the first transceiver to the second transceiver; and the second transceiver comprises:
   a second constant current circuit into which a current flows, the current having a level which changes according to a second logical level of the second signal; and
   a second current difference compensation circuit for compensating for a difference between the current flowing into the second constant current circuit and the current flowing along the transmission line in a direction from the first transceiver to the second transceiver,
   wherein the current flow along the transmission line is in a constant direction from the first transceiver to the second transceiver, independent of the first logical level of the first signal, and the second logical level of the second signal.

2. A bidirectional signal transmission system according to claim 1, wherein a difference between the current flowing out of the first constant current circuit and the current flowing into the first current difference compensation circuit is greater than a difference between the current flowing out of the second current difference compensation circuit and the current flowing into the second constant current circuit.

3. A bidirectional signal transmission system according to claim 2, wherein:
   a power source potential is provided to the first transceiver and the second transceiver via a power source line; and
   a direction in which a voltage decreases along the power source line coincides with a direction in which the current flows along the transmission line.

4. A bidirectional signal transmission system according to claim 1, further comprising a current consumption stabilization circuit for constantly maintaining a current consumption in the bidirectional signal transmission system independently of the logical level of the first signal and the logical level of the second signal.

5. A bidirectional signal transmission system for signal transmission between a first transceiver and a second transceiver, wherein:
   the bidirectional signal transmission system comprises a plurality of transmission units;
   each of the transmission units includes a transmission line for connecting the first transceiver and the second transceiver with each other, transmits a first signal from the first transceiver to the second transceiver while simultaneously transmitting a second signal from the second transceiver to the first transceiver, and generates onto the transmission line a current which flows in a predetermined constant direction for the transmission unit independent of a first logical level of the first signal and a second logical level of the second signal, the predetermined constant direction being in a first constant direction from the first transceiver to the second transceiver and a second constant direction from the second transceiver to the first transceiver; and among the plurality of transmission units included in the bidirectional signal transmission system, the number of transmission units which generate a current which flows in the first constant direction is substantially equal to the number of transmission units which generate a current which flows in the second constant direction.

6. A bidirectional signal transmission system according to claim 5, wherein:

each of the transmission units further comprises:
 a first constant current circuit out of which a current flows, the current having a level which changes according to a logical level of the first signal;
 a first current difference compensation circuit for compensating for a difference between the current flowing out of the first constant current circuit and a current flowing along the transmission line;
 a second constant current circuit into which a current flows, the current having a level which changes according to a logical level of the second signal; and
 a second current difference compensation circuit for compensating for a difference between the current flowing into the second constant current circuit and the current flowing along the transmission line;

each of the first constant current circuit and the first current difference compensation circuit is connected to an end of the transmission line on the side of the first transceiver; and each of the second constant current circuit and the second current difference compensation circuit is connected to another end of the transmission line on the side of the second transceiver.

* * * * *